(12) United States Patent
France et al.

(10) Patent No.: US 6,840,069 B2
(45) Date of Patent: Jan. 11, 2005

(54) SYSTEMS FOR CONTROLLING A DRYING CYCLE IN A DRYING APPARATUS

(75) Inventors: Paul Amaat Raymond Gerard France, West Chester, OH (US); Arseni Valerevich Radomyselski, Hamilton, OH (US)

(73) Assignee: Procter & Gamble Company, Cincinnati, OH (US)

(*) Notice: Subject to any disclaimer, the term of this patent is extended or adjusted under 35 U.S.C. 154(b) by 326 days.

(21) Appl. No.: 09/849,684

(22) Filed: May 4, 2001

(65) Prior Publication Data

US 2002/0004995 A1 Jan. 17, 2002

Related U.S. Application Data

(60) Provisional application No. 60/260,927, filed on Jan. 11, 2001, provisional application No. 60/209,468, filed on Jun. 5, 2000, provisional application No. 60/209,250, filed on Jun. 5, 2000, provisional application No. 60/209,443, filed on Jun. 5, 2000, and provisional application No. 60/209,444, filed on Jun. 5, 2000.

(51) Int. Cl.[7] .............................................. D06F 33/00
(52) U.S. Cl. ..................................... 68/12.02; 68/12.08
(58) Field of Search ............................... 68/5 C, 12.02, 68/12.08, 13 R, 18 R; 8/142

(56) References Cited

U.S. PATENT DOCUMENTS

| | | | |
|---|---|---|---|
| 3,635,667 A | 1/1972 | Keay et al. ..................... | 8/142 |
| 3,663,160 A | 5/1972 | Stone et al. .................... | 8/137 |
| 3,854,871 A | 12/1974 | Eanzel et al. ................... | 8/142 |
| 4,077,770 A | 3/1978 | Rouvellat et al. ............... | 8/142 |
| 4,097,397 A | 6/1978 | Mizutani et al. ............ | 252/153 |
| 4,102,824 A | 7/1978 | Mizutani et al. ............ | 252/545 |
| 4,111,034 A | 9/1978 | Hubner .......................... | 73/23 |
| 4,137,044 A | 1/1979 | Flower et al. .................. | 8/137 |
| 4,207,072 A | 6/1980 | Schuierer et al. ............... | 8/137 |

(List continued on next page.)

FOREIGN PATENT DOCUMENTS

| | | |
|---|---|---|
| CA | 1 239 326 | 7/1988 |
| DE | 2108 991 | 8/1972 |
| DE | 3739711 A | 6/1989 |
| DE | 198 10907 A1 | 9/1999 |
| EP | 1 451 600 A | 10/1976 |
| EP | 1 509 315 | 5/1978 |
| EP | 0 091 261 A2 | 10/1983 |
| EP | 0182583 A2 | 5/1986 |

(List continued on next page.)

OTHER PUBLICATIONS

US 6,001,133, 12/1999, DeYoung et al. (withdrawn)

XP 00218007, (Abstract).

XP 002180808, (Abstract only).

XP 002180809, (Abstract only).

XP 002180810, (Abstract only).

Trilo et al.; "Critical Micelle Density for the Self–Assembly of Block Copolymer Surfactants in Supercritical Carbon Dioxide"; pp. 416–421.

Sarbu et al.; "Non–Fluorous Polymers with Very High Solubility in Supercritical $CO_2$ Down to Low Pressures"; pp. 165–168.

*Primary Examiner*—Frankie L. Stinson
*Assistant Examiner*—Joseph Perrin
(74) *Attorney, Agent, or Firm*—C. Brant Cook; Caroline Wei-Berk; Kim W. Zerby

(57) ABSTRACT

The present invention relates to systems for controlling a drying cycle in a drying apparatus by monitoring the lipophilic fluid vapor concentration. The systems utilize a gas sensor capable of sensing the concentration of lipophilic fluid vapor in the drying apparatus drum or a combination of sensors/condition detectors, at least one of which is capable of sensing the concentration of lipophilic fluid vapor in the drying apparatus drum.

19 Claims, 5 Drawing Sheets

U.S. PATENT DOCUMENTS

| | | | | |
|---|---|---|---|---|
| 4,267,077 | A | 5/1981 | Niimi et al. | 252/545 |
| 4,708,807 | A | 11/1987 | Kemerer | 252/8.6 |
| 4,761,896 | A | 8/1988 | Miyata | 74/77 |
| 4,909,962 | A | 3/1990 | Clark | 252/547 |
| 5,037,485 | A | 8/1991 | Chromecek et al. | 134/7 |
| 5,046,337 | A | 9/1991 | Ro et al. | 68/18 F |
| 5,057,240 | A | 10/1991 | Madore et al. | 510/328 |
| 5,116,426 | A | 5/1992 | Yokohama et al. | 134/40 |
| 5,271,775 | A | 12/1993 | Asano et al. | 134/40 |
| 5,302,313 | A | 4/1994 | Asano et al. | 252/171 |
| 5,360,571 | A | 11/1994 | Kilgour et al. | 252/174.15 |
| 5,443,747 | A | 8/1995 | Inada et al. | 252/94 |
| 5,503,681 | A | 4/1996 | Inada et al. | 134/1 |
| 5,503,778 | A | 4/1996 | Liu et al. | 252/542 |
| 5,520,827 | A | 5/1996 | Danner | 252/8.6 |
| 5,593,507 | A | 1/1997 | Inada et al. | 134/11 |
| 5,597,792 | A | 1/1997 | Klier et al. | 510/417 |
| 5,628,833 | A | 5/1997 | McCormack et al. | 134/26 |
| 5,676,705 | A | 10/1997 | Jureller et al. | 8/142 |
| 5,683,473 | A | 11/1997 | Jureller et al. | 8/142 |
| 5,683,977 | A | 11/1997 | Jureller et al. | 510/286 |
| 5,690,750 | A | 11/1997 | Inada et al. | 134/11 |
| 5,705,562 | A | 1/1998 | Hill | 524/731 |
| 5,707,613 | A | 1/1998 | Hill | 424/78.03 |
| 5,716,456 | A | 2/1998 | Inada et al. | 134/10 |
| 5,722,781 | A | 3/1998 | Yamaguchi | 400/61 |
| 5,741,365 | A | 4/1998 | Inada et al. | 134/1 |
| 5,769,962 | A | 6/1998 | Inada et al. | 134/29 |
| 5,783,092 | A | 7/1998 | Brown et al. | 210/759 |
| 5,811,383 | A | 9/1998 | Klier et al. | 510/417 |
| 5,858,022 | A | 1/1999 | Romack et al. | 8/142 |
| 5,865,852 | A | 2/1999 | Berndt | 8/142 |
| 5,866,005 | A | 2/1999 | DeSimone et al. | 210/634 |
| 5,876,510 | A | 3/1999 | Kuemin et al. | 134/12 |
| 5,877,133 | A | 3/1999 | Good | 510/175 |
| 5,888,250 | A | 3/1999 | Hayday et al. | 8/142 |
| 5,929,012 | A | 7/1999 | Del Duca et al. | 510/303 |
| 5,942,007 | A | 8/1999 | Berndt et al. | 8/142 |
| 5,944,996 | A | 8/1999 | DeSimone et al. | 210/634 |
| 5,954,869 | A | 9/1999 | Elfersy et al. | 106/287.16 |
| 5,977,040 | A | 11/1999 | Inada et al. | 510/165 |
| 5,977,045 | A | 11/1999 | Murphy | 510/289 |
| 5,985,810 | A | 11/1999 | Inada et al. | 510/175 |
| 6,013,683 | A | 1/2000 | Hill et al. | 516/67 |
| 6,042,617 | A | 3/2000 | Berndt | 8/142 |
| 6,042,618 | A | 3/2000 | Berndt et al. | 8/142 |
| 6,056,789 | A | 5/2000 | Berndt et al. | 8/142 |
| 6,059,845 | A | 5/2000 | Berndt et al. | 8/142 |
| 6,060,546 | A | 5/2000 | Powell et al. | 524/267 |
| 6,063,135 | A | 5/2000 | Berndt et al. | 8/142 |
| 6,086,635 | A | 7/2000 | Berndt et al. | 8/142 |
| 6,114,295 | A | 9/2000 | Murphy | 510/286 |
| 6,131,421 | A | 10/2000 | Jureller et al. | 68/13 R |
| 6,136,766 | A | 10/2000 | Inada et al. | 510/167 |
| 6,148,644 | A | 11/2000 | Jureller et al. | 68/13 R |
| 6,156,074 | A | 12/2000 | Hayday et al. | 8/142 |
| 6,177,399 | B1 | 1/2001 | Mei et al. | 510/466 |
| 6,200,352 | B1 | 3/2001 | Romack et al. | 8/142 |
| 6,200,393 | B1 | 3/2001 | Romack et al. | 134/10 |
| 6,200,943 | B1 | 3/2001 | Romack et al. | 510/285 |
| 6,204,233 | B1 | 3/2001 | Smith et al. | 510/283 |
| 6,228,826 | B1 | 5/2001 | DeYoung et al. | 510/291 |
| 6,242,408 | B1 | 6/2001 | Elms et al. | 510/375 |
| 6,310,029 | B1 | 10/2001 | Kilgour et al. | 510/175 |
| 6,313,079 | B1 | 11/2001 | Murphy et al. | 510/285 |
| 6,368,359 | B1 | 4/2002 | Perry et al. | 8/142 |

FOREIGN PATENT DOCUMENTS

| | | |
|---|---|---|
| EP | 0410 068 A1 | 1/1991 |
| EP | 0 422 787 A2 | 4/1991 |
| EP | 0 566 240 A1 | 10/1993 |
| EP | 0 479 146 B1 | 12/1996 |
| EP | 0 962519 A1 | 12/1999 |
| EP | 1 041 189 A1 | 10/2000 |
| EP | 1 092 803 A1 | 4/2001 |
| FR | 2 268 898 A1 | 11/1975 |
| GB | 2 084 204 A | 4/1982 |
| GB | 2 230 022 A | 10/1990 |
| GB | 2 251 867 A | 7/1992 |
| JP | 1098-798 A | 4/1989 |
| JP | 1188-595 A | 7/1989 |
| JP | 01277600 A * | 11/1989 |
| JP | 2166-198 A | 6/1990 |
| JP | 2202-599 A | 8/1990 |
| JP | 3046-300 A | 2/1991 |
| JP | 3063-799 A | 3/1991 |
| JP | 04323299 A | 11/1992 |
| JP | 05051598 A | 8/1993 |
| JP | 05239766 A | 9/1993 |
| JP | 08073837 A | 3/1996 |
| JP | 09143497 A | 6/1997 |
| JP | 10-017891 | 1/1998 |
| JP | 11-092784 | 4/1999 |
| JP | 2222-496 A | 9/1999 |
| JP | 11-323381 | 11/1999 |
| JP | 11-323383 | 11/1999 |
| JP | 00144175 A | 5/2000 |
| JP | 2000-192085 | 7/2000 |
| JP | 00290689 A | 10/2000 |
| WO | WO 82/02218 A1 | 7/1982 |
| WO | WO 94/01227 A1 | 1/1994 |
| WO | WO 96/30471 A2 | 10/1996 |
| WO | WO 97/35061 A1 | 9/1997 |
| WO | WO 98/07405 A1 | 2/1998 |
| WO | WO 98/16615 A1 | 4/1998 |
| WO | WO 99/57358 | 11/1999 |
| WO | WO 00/04221 | 1/2000 |
| WO | WO 00/04222 | 1/2000 |
| WO | WO 00/63340 | 10/2000 |
| WO | WO 01/06051 A1 | 1/2001 |
| WO | WO 01/34613 A1 | 5/2001 |
| WO | WO 01/34706 A1 | 5/2001 |
| WO | WO 01/40567 A1 | 6/2001 |
| WO | WO 01/48297 A1 | 7/2001 |

* cited by examiner

S - gas sensor output signal

CX - condition sensor output signal

F - flash point value related to a combination of S and CX

TX - threshlod value for condition sensors

V - threshlod value for gas sensor

SYSTEMS FOR CONTROLLING A DRYING CYCLE IN A DRYING APPARATUS

RELATED APPLICATIONS

This application claims priority under 35 U.S.C. 119(e) to U.S. Provisional Application Ser. Nos. 60/209,468, 60/209,250, 60/209,443 and 60/209,444 all of which were filed on Jun. 5, 2000, and under 35 U.S.C. 119(e) to U.S. Provisional Application Ser. No. 60/260,927 filed on Jan. 11, 2001.

FIELD OF THE INVENTION

The present invention relates to systems for controlling a drying cycle in a drying apparatus by monitoring the lipophilic fluid vapor concentration. The systems utilize a gas sensor capable of sensing the concentration of lipophilic fluid vapor in the drying apparatus drum or a combination of sensors/condition detectors, at least one of which is capable of sensing the concentration of lipophilic fluid vapor in the drying apparatus drum.

BACKGROUND OF THE INVENTION

Conventional laundering techniques for the cleaning and treatment of fabric articles such as garments have long involved both traditional aqueous-based washing and a technique commonly referred to as "dry cleaning". Traditional aqueous based washing techniques have involved immersion of the fabric articles in a solution of water and detergent or soap products, followed by rinsing and drying. However, such conventional immersion cleaning techniques have proven unsatisfactory on a wide range of fabric articles that require special handling and/or cleaning methods due to fabric content, construction, etcetera, which may be unsuitable for immersion in water.

Accordingly, "dry cleaning" has been developed. Dry cleaning typically involves the use of non-aqueous, lipophilic fluids as the solvent or solution for cleaning. While the absence of water permits the cleaning of fabrics without the potential disastrous side effects water may cause, these lipophilic fluids do not perform well on hydrophilic and/or combination soils.

As a result, new methods have been developed wherein a lipophilic fluid is emulsified with water in order to better perform on these hydrophilic and/or combination soils. Along with this development, however, have arisen new problems. First, many lipophilic fluids have established "safe" exposure/inhalation limits. Second, the drying of items cleaned with the lipophilic fluid cannot be done automatically with the use of only a humidity sensor. Third, energy savings could be appreciated if the items to be dried are exposed to heat and tumbling only for time needed to achieve drying. This would also reduce heat and tumbling damage to the items. Lastly, because these lipophilic fluids possess far greater fouling capabilities than water alone as well as potential flash point problems, sensors typically used in clothes dryers may not be suitable for use in lipophilic fluid clothes dryers.

U.S. Pat. No. 6,122,480 (herein incorporated by reference) discloses a system for determining drying time in a clothes dryer that utilizes a humidity sensor. However, the present invention is directed to drying lipophilic fluid from fabrics—not water. Further, U.S. Pat. No. 4,111,034 (herein incorporated by reference) is directed to an apparatus for monitoring the solvent content of air in association with a dry-cleaning plant. The present invention is directed to detecting levels of several lipophilic fluids, some of which tend to foul sensors, in many environments, including the home.

Accordingly, the need remains for a system that controls a drying cycle in a drying apparatus by utilizing a gas sensor capable of sensing the concentration of lipophilic fluid vapor in the drying apparatus drum or a combination of sensors/condition detectors, at least one of which is capable of sensing the concentration of lipophilic fluid vapor in the drying apparatus drum.

SUMMARY OF THE INVENTION

The present invention provides control over a drying cycle in a drying apparatus that utilizes a gas sensor capable of sensing the concentration of lipophilic fluid vapor in the drying apparatus drum or a combination of sensors/condition detectors, at least one of which is capable of sensing the concentration of lipophilic fluid vapor in the drying apparatus drum.

In a first embodiment, the present invention provides a system for controlling a drying cycle in a drying apparatus, wherein said drying apparatus comprises a lipophilic fluid vapor, a gas sensor capable of sensing the concentration of lipophilic fluid vapor present in said drying apparatus and transmitting a signal representative of the lipophilic fluid vapor concentration such that said drying cycle is controlled.

In a second embodiment, the present invention provides a system for controlling a drying cycle in a drying apparatus comprising, a condition detector and a gas sensor wherein said condition detector is capable of activating said gas sensor and said gas sensor is capable of generating a signal representative of the lipophilic fluid vapor concentration in the dryer such that the drying cycle is controlled.

In a third embodiment, the present invention provides a method for treating fabrics in need of treatment comprising placing said fabrics in a drying apparatus comprising a gas sensor capable of sensing lipophilic fluid vapor concentration within said drying apparatus and transmitting a signal representative of said lipophilic fluid vapor concentration, contacting said fabrics with a lipophilic fluid, and operating said drying apparatus such that the drying cycle is controlled by said gas sensor These and other aspects, features and advantages will become apparent to those of ordinary skill in the art from the following detailed description and the appended claims. All percentages, ratios and proportions herein are by weight, unless otherwise specified. All temperatures are in degrees Celsius (° C.) unless otherwise specified. All measurements are in SI units unless otherwise specified. All documents cited are, in relevant part, incorporated herein by reference.

DETAILED DESCRIPTION OF THE INVENTION

Definitions

Figure 1:
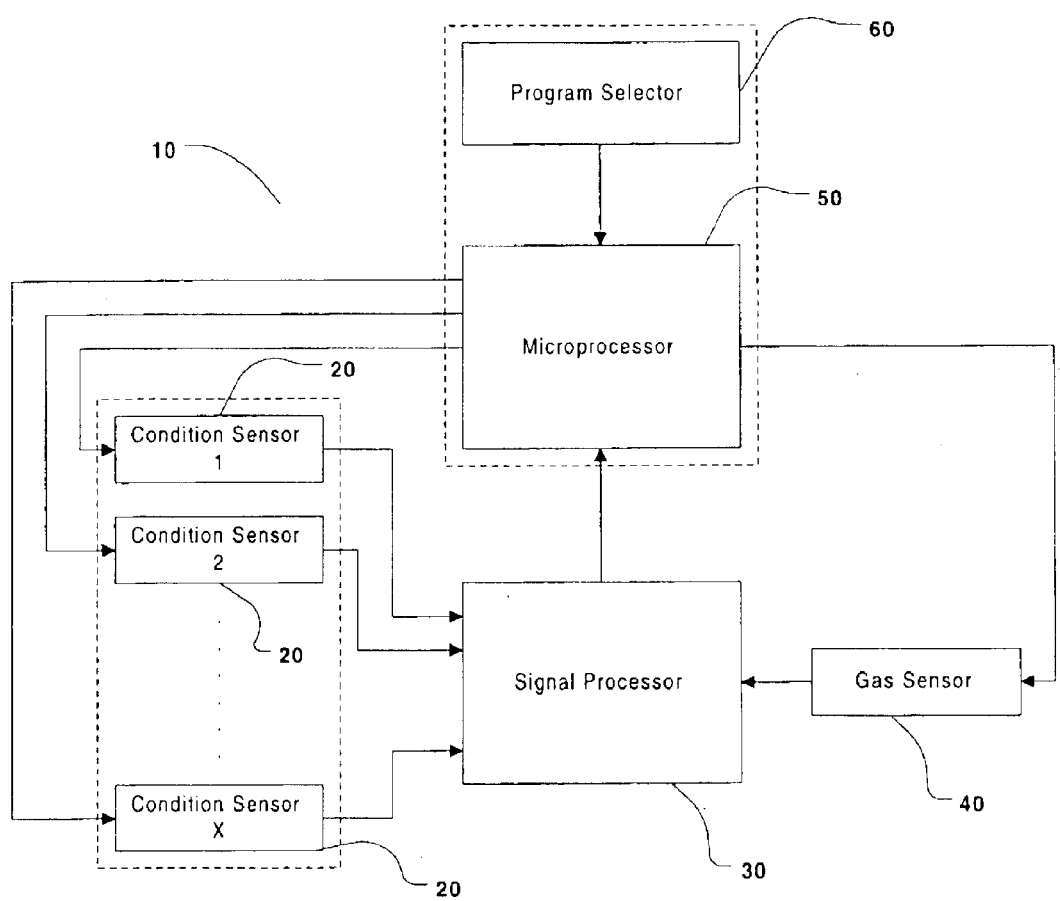
FIG. 1 is a box diagram of a drying time determining system in accordance with one of the embodiments of the present invention.

The term "lipophilic fluid" used herein is intended to encompass any non-aqueous fluid or vapor capable of removing sebum, as qualified by the test described below.

The term "fabrics" and "fabric" used herein is intended to mean any article that is customarily cleaned in a water-based laundry process or in a solvent-based dry cleaning process.

As such the term encompasses bulk fabrics and fibers, as well as finished articles of clothing, linens, drapery, and clothing accessories. The term also encompasses other items made in whole or in part of fabric, such as tote bags, furniture covers, tarpaulins and the like.

The term "condition detector" used herein is intended to mean any detector and/or sensor capable of quantitatively and/or qualitatively measuring some scientific quality. These qualities may include, and are not limited to, time, temperature, fluid flow, and torque. Further, the measure may be of a physical quality within the drying apparatus (e.g., torque on the spinning drum or inlet air temperature), a physical quality of the fabric load to be dried (e.g., mass or time exposed to drying conditions), a physical quality measured on the outside of the drying apparatus (e.g., condensed fluid flow or outlet air temperature), or any combination thereof.

The term "drying apparatus" used herein is intended to mean any apparatus capable of removing fluid from fabrics. The removal means can be temperature change, gas circulation, light introduction, tumbling, agitation, and combinations of any of these means. The term includes an apparatus capable of "dual mode" functions. A "dual mode" apparatus is one capable of both washing and drying fabrics within the same drum. These apparati are commercially available.

The term "safe" used herein is intended to mean the established exposure level for any type of human contact. Specifically, lipophilic fluids suitable for use with the present invention may have established exposure level classifications like contact or absorption, inhalation, and ingestion. For lipophilic fluids with established contact and/or inhalation maximum levels, one of the objects of the present invention is to dry fabrics within a drying operation comprising lipophilic fluid vapor to a level at or below the least of the maximum exposure levels for a particular lipophilic fluid. Safe exposure limits for various lipophilic fluids can be found in: American Conference of Governmental Industrial Hygienists (ACGIH), "Threshold Limit Values (TLVs) for Chemical Substances and Physical Agents" Second Printing, 1995, ISBN 1-882417-11-9 and National Research Council, "Spacecraft Maximum Allowable Concentrations for Selected Airborne Contaminants," Volume 4, Chapter B7, Page 151–173, Published by National Academy Press, 2000, ISBN 0-309-06795-2 (both sources herein incorporated by reference).

Lipophilic Fluid

In general, lipophilic fluid can be fully liquid at ambient temperature and pressure, can be an easily melted solid, e.g., one which becomes liquid at temperatures in the range from about 0 deg. C. to about 60 deg. C., or can comprise a mixture of liquid and vapor phases at ambient temperatures and pressures, e.g., at 25 deg. C. and 1 atm. pressure. Thus, the essential lipohilic fluid is not a compressible gas such as carbon dioxide. It is preferred that the lipophilic fluid herein be nonflammable or have relatively high flash points and/or low VOC characteristics, these terms having their conventional meanings as used in the dry cleaning industry, to equal or, preferably, exceed the characteristics of known conventional dry cleaning fluids.

Suitable lipophilic fluids herein readily flow and are non-viscous. In general, the lipophilic fluids herein are required to be fluids capable of at least partially dissolving sebum (e.g. body soil) as defined in the test hereinafter. Mixtures of lipophilic fluid are also suitable, and provided that the requirements of the test are met, the lipophilic fluid can include any fraction of dry-cleaning solvents, especially newer types including non-fluorinated solvents, or perfluorinated amines. Some perfluorinated amines such as perfluorotributylamines while unsuitable for use as lipohilic fluid may be present as one of many possible adjuncts present in the lipohilic fluid. Other suitable lipohilic fluids include diol solvent systems e.g., higher diols such as C6- or C8- or higher diols; organosilicone solvents including both cyclic and acyclic types, and the like; and mixtures thereof.

A preferred group of nonaqueous liquids suitable for incorporation as the major component of the lipophilic fluid includes low-volatility non-fluorinated organics, silicones, especially those other than amino-functional silicones, and mixtures thereof. Low volatility nonfluorinated organics include for example OLEAN® and other polyol esters, or certain relatively nonvolatile biodegradable mid-chain branched petroleum fractions. Suitable silicones for use as a major component, e.g., more than 50%, of the lipophilic fluid include cyclopentasiloxane, sometimes termed "D5", or linear analogs having approximately similar volatility, optionally complemented by other compatible silicones. Suitable silicones are well known in the literature, see, for example, Kirk Othmer's Encyclopedia of Chemical Technology, and are available from a number of commercial sources, including General Electric, Toshiba Silicone, Bayer, and Dow Corning. Other suitable fluids are commercially available from Procter & Gamble or from Dow Chemical and other suppliers. For example one suitable silicone is SF-1528 available from GE silicone fluids. Notably, SF-1528 fluid is 90% cyclopentasiloxane (D5).

Any non-aqueous fluid that is both capable of meeting known requirements for a dry-cleaning fluid (e.g., flash point etc.) and is capable of at least partially dissolving sebum, as indicated by the test method described below, is suitable as a lipophilic fluid herein. The ability of a particular material to remove sebum can be measured by any known technique. As a general guideline, perfluorobutylamine (Fluorinert FC-43®) on its own (with or without adjuncts) is a reference material that, by definition, is unsuitable as the lipophilic fluid herein (it is essentially a non-solvent) while D5 dissolves sebum.

The following is the method for investigating and qualifying other materials, e.g., other low-viscosity, free-flowing silicones, for use as the lipophilic fluid. The method uses commercially available Crisco® canola oil, oleic acid (95% pure, available from Sigma Aldrich Co.) and squalene (99% pure, available from J. T. Baker) as model soils for sebum. The test materials should be substantially anhydrous and free from any added adjuncts, or other materials during evaluation.

Prepare three vials. Place 1.0 g of canola oil in the first; in a second vial place 1.0 g of the oleic acid (95%), and in a third and final vial place 1.0 g of the squalene (99.9%). To each vial add 1 g of the fluid to be tested for lipophilicity. Separately mix at room temperature and pressure each vial containing the lipophilic soil and the fluid to be tested for 20 seconds on a standard vortex mixer at maximum setting. Place vials on the bench and allow settling for 15 minutes at room temperature and pressure. If, upon standing, a single phase is formed in any of the vials containing lipophilic soils, then the fluid qualifies as suitable for use as a "lipophilic fluid" in accordance with the invention. However, if two or more separate layers are formed in all three vials, then the amount of fluid dissolved in the test fluid will need to be further determined before rejecting or accepting the fluid as qualified.

In such a case, with a syringe, carefully extract a 200 microliter sample from each layer in each vial. The syringe-extracted layer samples are placed in GC autosampler vials and subjected to conventional GC analysis after determining the retention time of calibration samples of each of the three models soils and the fluid being tested. If more than 1% of the test fluid by GC, preferably greater, is found to be present in any one of the layers which consists of the oleic acid, canola oil or squalene layer, then the test fluid is also qualified for use as a lipophilic fluid. If needed, the method can be further calibrated using heptacosafluorotributylamine, i.e., Fluorinert FC-43 (fail) and cyclopentasiloxane (pass).

A suitable GC is a Hewlett Packard Gas Chromatograph HP5890 Series II equipped with a split/splitless injector and FID. A suitable column used in determining the amount of lipophilic fluid present is a J&W Scientific capillary column DB-1HT, 30 meter, 0.25 mm id, 0.1 um film thickness cat# 1221131. The GC is suitably operated under the following conditions:

Carrier Gas: Hydrogen

Column Head Pressure: 9 psi

Flows: Column Flow @~1.5 ml/min.
 Split Vent @~250–500 ml/min.
 Septum Purge @ 1 ml/min.

Injection: HP 7673 Autosampler, 10 ul syringe, 1 ul injection

Injector Temperature: 350° C.

Detector Temperature: 380° C.

Oven Temperature Program: initial 60° C., hold 1 min.
 rate 25° C./min.
 final 380° C. hold 30 min.

Preferred lipophilic fluids suitable for use herein can further be qualified for use on the basis of having an excellent garment care profile. Garment care profile testing is well known in the art and involves testing a fluid to be qualified using a wide range of garment or fabric article components, including fabrics, threads and elastics used in seams, etc., and a range of buttons. Preferred lipophilic fluids for use herein have an excellent garment care profile, for example they have a good shrinkage or fabric puckering profile and do not appreciably damage plastic buttons.

For purposes of garment care testing or other qualification, e.g., flammability, a lipophilic fluid can be present in a mixture, e.g., with water, at approximately the ratio to be used in the final lipophilic fluid that will come into contact with fabric articles. Certain materials that remove sebum and which otherwise qualify for use as lipophilic fluids, for example, ethyl lactate can be quite objectionable due to its tendency to dissolve buttons. If such a material is to be used in the lipophilic fluid, it will be formulated with water and/or other solvents such that the overall mix is not substantially damaging to buttons. Other lipophilic fluids, D5 for example, meet the garment care requirements commendably. Some suitable lipophilic fluids may be found in granted U.S. Pat. Nos. 5,865,852; 5,942,007; 6,042,617; 6,042,618; 6,056,789; 6,059,845; and 6,063,135.

Lipophilic solvents can include linear and cyclic polysiloxanes, hydrocarbons and chlorinated hydrocarbons. More preferred are the linear and cyclic polysiloxanes and hydrocarbons of the glycol ether, acetate ester, lactate ester families. Preferred lipophilic solvents include cyclic siloxanes having a boiling point at 760 mm Hg. of below about 250° C. Specifically preferred cyclic siloxanes for use in this invention are octamethylcyclotetrasiloxane, decamethylcyclopentasiloxane, and dodecamethylcyclohexasiloxane. Preferably, the cyclic siloxane comprises decamethylcyclopentasiloxane (D5, pentamer) and is substantially free of octamethylcyclotetrasiloxane (tetramer) and dodecamethylcyclohexasiloxane (hexamer).

However, it should be understood that useful cyclic siloxane mixtures might contain, in addition to the preferred cyclic siloxanes, minor amounts of other cyclic siloxanes including octamethylcyclotetrasiloxane and hexamethylcyclotrisiloxane or higher cyclics such as tetradecamethylcycloheptasiloxane. Generally the amount of these other cyclic siloxanes in useful cyclic siloxane mixtures will be less than about 10 percent based on the total weight of the mixture.

The industry standard for cyclic siloxane mixtures is that such mixtures comprise less than about 1% by weight of the mixture of octamethylcyclotetrasiloxane.

Accordingly, the lipophilic fluid of the present invention preferably comprises more than about 50%, more preferably more than about 75%, even more preferably at least about 90%, most preferably at least about 95% by weight of the lipophilic fluid of decamethylcyclopentasiloxane. Alternatively, the lipophilic fluid may comprise siloxanes which are a mixture of cyclic siloxanes having more than about 50%, preferably more than about 75%, more preferably at least about 90%, most preferably at least about 95% up to about 100% by weight of the mixture of decamethylcyclopentasiloxane and less than about 10%, preferably less than about 5%, more preferably less than about 2%, even more preferably less than about 1%, most preferably less than about 0.5% to about 0% by weight of the mixture of octamethylcyclotetrasiloxane and/or dodecamethylcyclohexasiloxane.

Adjunct Ingredients

Adjunct materials can vary widely and can be used at widely ranging levels. For example, detersive enzymes such as proteases, amylases, cellulases, lipases and the like as well as bleach catalysts including the macrocyclic types having manganese or similar transition metals all useful in laundry and cleaning products can be used herein at typical or atypical levels. Adjunct materials that are catalytic, for example enzymes, can be used in "forward" or "reverse" modes, a discovery independently useful from the present invention. For example, a lipolase or other hydrolase may be used, optionally in the presence of alcohols as adjuncts, to convert fatty acids to esters, thereby increasing their solubility in the lipophilic fluid. This is a "reverse" operation, in contrast with the normal use of this hydrolase in water to convert a less water-soluble fatty ester to a more water-soluble material. In any event, any adjunct ingredient must be suitable for use in combination with the lipophilic fluid.

The compositions may comprise emulsifiers. Emulsifiers are well known in the chemical art. Essentially, an emulsifier acts to bring two or more insoluble or semi-soluble phases together to create a stable or semi-stable emulsion. It is preferred in the claimed invention that the emulsifier serves a dual purpose wherein it is capable of acting not only as an emulsifier but also as a treatment performance booster. For example, the emulsifier may also act as a surfactant thereby boosting cleaning performance. Both ordinary emulsifiers and emulsifier/surfactants are commercially available.

Some suitable cleaning additives include, but are not limited to, builders, surfactants, enzymes, bleach activators, bleach catalysts, bleach boosters, bleaches, alkalinity sources, antibacterial agents, colorants, perfumes, pro-perfumes, finishing aids, lime soap dispersants, composition malodor control agents, odor neutralizers, polymeric dye transfer inhibiting agents, crystal growth inhibitors, photobleaches, heavy metal ion sequestrants, anti-tarnishing agents, anti-microbial agents, anti-oxidants, anti-redeposition agents, electrolytes, pH modifiers, thickeners, abrasives, divalent or trivalent ions, metal ion salts, enzyme stabilizers, corrosion inhibitors, diamines or polyamines and/or their alkoxylates, suds stabilizing polymers, solvents, process aids, fabric softening agents, optical brighteners, hydrotropes, suds or foam suppressors, suds or foam boosters, fabric softeners, antistatic agents, dye fixatives, dye abrasion inhibitors, anti-crocking agents, wrinkle reduction agents, wrinkle resistance agents, soil release polymers, soil repellency agents, sunscreen agents, anti-fade agents, and mixtures thereof.

The term "surfactant" conventionally refers to materials that are surface-active either in the water, the lipophilic fluid, or the mixture of the two. Some illustrative surfactants include nonionic, cationic and silicone surfactants as used in conventional aqueous detergent systems. Suitable nonionic surfactants include, but are not limited to:

a) Polyethylene oxide condensates of nonyl phenol and myristyl alcohol, such as in U.S. Pat. No. 4,685,930 Kasprzak; and
b) fatty alcohol ethoxylates, R—(OCH$_2$CH$_2$)$_a$OH a=1 to 100, typically 12–40, R=hydrocarbon residue 8 to 20 C atoms, typically linear alkyl. Examples polyoxyethylene lauryl ether, with 4 or 23 oxyethylene groups; polyoxyethylene cetyl ether with 2, 10 or 20 oxyethylene groups; polyoxyethylene stearyl ether, with 2, 10, 20, 21 or 100 oxyethylene groups; polyoxyethylene (2), (10) oleyl ether, with 2 or 10 oxyethylene groups. Commercially available examples include, but are not limited to: ALFONIC, BRIJ, GENAPOL, NEODOL, SURFONIC, TRYCOL. See also U.S. Pat. No. 6,013,683 Hill et al.

Suitable cationic surfactants include, but are not limited to, dialkyldimethylammonium salts having the formula:

R'R"N$^+$(CH$_3$)$_2$X$^-$

Where each R'R" is independently selected from the group consisting of 12–30 C atoms or derived from tallow, coconut oil or soy, X=Cl or Br, Examples include: didodecyldimethylammonium bromide (DDAB), dihexadecyldimethyl ammonium chloride, dihexadecyldimethyl ammonium bromide, dioctadecyldimethyl ammonium chloride, dieicosyldimethyl ammonium chloride, didocosyldimethyl ammonium chloride, dicoconutdimethyl ammonium chloride, ditallowdimethyl ammonium bromide (DTAB). Commercially available examples include, but are not limited to: ADOGEN, ARQUAD, TOMAH, VARIQUAT. See also U.S. Pat. No. 6,013,683 Hill et al.

Suitable silicone surfactants include, but are not limited to the polyalkyleneoxide polysiloxanes having a dimethyl polysiloxane hydrophobic moiety and one or more hydrophilic polyalkylene side chains and have the general formula:

R$^1$—(CH$_3$)$_2$SiO—[(CH$_3$)$_2$SiO]$_a$—[(CH$_3$)(R$^1$)SiO]$_b$—Si(CH$_3$)$_2$—R$^1$ wherein a+b are from about 1 to about 50, preferably from about 3 to about 30, more preferably from about 10 to about 25, and each R$^1$ is the same or different and is selected from the group consisting of methyl and a poly(ethyleneoxide/propyleneoxide) copolymer group having the general formula:

—(CH$_2$)$_n$O(C$_2$H$_4$O)$_c$ (C$_3$H$_6$O)$_d$R$^2$ with at least one R$^1$ being a poly(ethyleneoxide/propyleneoxide) copolymer group, and wherein n is 3 or 4, preferably 3; total c (for all polyalkyleneoxy side groups) has a value of from 1 to about 100, preferably from about 6 to about 100; total d is from 0 to about 14, preferably from 0 to about 3; and more preferably d is 0; total c+d has a value of from about 5 to about 150, preferably from about 9 to about 100 and each R$^2$ is the same or different and is selected from the group consisting of hydrogen, an alkyl having 1 to 4 carbon atoms, and an acetyl group, preferably hydrogen and methyl group. Examples of these surfactants may be found in U.S. Pat. Nos. 5,705,562 and 5,707,613, both to Hill.

Examples of this type of surfactants are the Silwet® surfactants which are available C K Witco, OSi Division, Danbury, Conn. Representative Silwet surfactants are as follows.

| Name | Average MW | Average a + b | Average total c |
|------|-----------|---------------|-----------------|
| L-7608 | 600 | 1 | 9 |
| L-7607 | 1,000 | 2 | 17 |
| L-77 | 600 | 1 | 9 |
| L-7605 | 6,000 | 20 | 99 |
| L-7604 | 4,000 | 21 | 53 |
| L-7600 | 4,000 | 11 | 68 |
| L-7657 | 5,000 | 20 | 76 |
| L-7602 | 3,000 | 20 | 29 |

The molecular weight of the polyalkyleneoxy group (R$^1$) is less than or equal to about 10,000. Preferably, the molecular weight of the polyalkyleneoxy group is less than or equal to about 8,000, and most preferably ranges from about 300 to about 5,000. Thus, the values of c and d can be those numbers which provide molecular weights within these ranges. However, the number of ethyleneoxy units (—C$_2$H$_4$O) in the polyether chain (R$^1$) must be sufficient to render the polyalkyleneoxide polysiloxane water dispersible or water soluble. If propyleneoxy groups are present in the polyalkylenoxy chain, they can be distributed randomly in the chain or exist as blocks. Preferred Silwet surfactants are L-7600, L-7602, L-7604, L-7605, L-7657, and mixtures thereof. Besides surface activity, polyalkyleneoxide polysiloxane surfactants can also provide other benefits, such as antistatic benefits, and softness to fabrics.

The preparation of polyalkyleneoxide polysiloxanes is well known in the art. Polyalkyleneoxide polysiloxanes of the present invention can be prepared according to the procedure set forth in U.S. Pat. No. 3,299,112. Another suitable silicone surfactant is SF-1488, which is commercially available from GE silicone fluids.

These and other surfactants suitable for use in combination with the lipophilic fluid as adjuncts are well known in the art, being described in more detail in Kirk Othmer's Encyclopedia of Chemical Technology, 3rd Ed., Vol. 22, pp. 360–379, "Surfactants and Detersive Systems." Further suitable nonionic detergent surfactants are generally disclosed in U.S. Pat. No. 3,929,678, Laughlin et al., issued Dec. 30, 1975, at column 13, line 14 through column 16, line 6.

The adjunct may also be an antistatic agent. Any suitable well-known antistatic agents used in laundering and dry cleaning art are suitable for use in the methods and compositions of the present invention. Especially suitable as antistatic agents are the subset of fabric softeners which are known to provide antistatic benefits. For example those fabric softeners which have a fatty acyl group which has an iodine value of above 20, such as N,N-di(tallowoyl-oxyethyl)-N,N-dimethyl ammonium methylsulfate. However, it is to be understood that the term "antistatic agent" is not to be limited only to this subset of fabric softeners and includes all antistatic agents.

Although the methods and/or compositions utilized in present invention will be described in detail, it should be understood, and one skilled in the art will recognize, that any compositions, processes, and/or apparati capable of carrying out the invention could be used.

Sensors

Many sensors can operate with the present invention. Listed below are nonlimiting examples of suitable sensors for use in the present invention. The list is not intended to be complete or exhaustive. A list of sensor types and their manufacturers can be found in the trade publication *Sensors*, September 2000, Volume 17, Number 9, pages 27 to 40.

Reactive Sensors

Reactive sensors generate a signal by measuring some aspect of a chemical reaction of the analyte. The analyte may be destroyed in the process. The smallest and cheapest sensors tend to be reactive types.

Electrochemical Sensors—A more precise term for this type is the "porous-electrode amperometric gas sensor". It is also called a fuel cell sensor. It will respond to gases that can be electrolytically reduced or oxidized on a metallic catalyst such as platinum or gold. Typical gases measured are O2, CO, NO2, NO, and H2S, and organic vapors such as alcohols, aldehydes, or ketones. Typical sensitivities are in the 3–30 PPM range, but some proprietary sensors are capable of detecting as little as 2 PPB of gases such as ozone, NO2, H2S or arsine.

Solid State Semiconductor Sensors—This sensor typically consists of a bead of tin oxide formed around two fine coils of platinum wire. When the bead is heated using one of the coils, the analyzed gas will oxidize on the bead surface, changing the electrical conductivity as measured between the heated and unheated coils. Nearly all oxidizable gases can be detected on the SSS sensor. Selectivity can be improved slightly by changing the operating temperature and by doping the tin oxide with various elements.

Combustible Gas Sensor—The electrical resistance of most metals will increase with temperature. The combustible gas sensor consists of little more than a coil of platinum wire that is electrically heated. When gases combust on the surface, some of the heat of combustion is transferred to the wire coil. The increase in coil temperature is reflected as an increase in electrical resistance.

Flame Ionization Detector (FID)—The FID works by burning the analyte gas in a hydrogen flame. In this environment, organic compounds produce positive ions, which are collected at a cylindrical electrode above the flame. A very small current will be generated between the collector and the metal flame jet. The FID is very sensitive and linear over many orders of magnitude. Because of the needs for hydrogen and a mechanically stable environment for the flame, the resulting instruments are complex, but some companies such as Foxboro have succeeded in making reliable FID instruments. FIDs are nearly nonselective among organic compounds, but they do limit their responses to organic compounds only.

Chemiluminescence—Certain chemical reactions generate light, which can be measured with great sensitivity. The most common application of chemiluminescence in gas detection is the measurement of nitric oxide by reaction with ozone; measurements of NO can be made down to the parts per trillion.

Physical Property Sensors

Physical property sensors generally leave the analyte gas undisturbed, and measure some property such as absorption of light or thermal conductivity.

Nondispersive Infrared (NDIR)—These are the simplest of the spectroscopic sensors. The key components are an infrared source, a light tube, an interference (wavelength) filter, and an infrared detector. The gas is pumped or diffuses into the light tube, and the electronics measures the absorption of the characteristic wavelength of light. NDIR sensors are most often used for measuring carbon dioxide. The best of these have sensitivities of 25–50 PPM.

Spectroscopic Sensors—These use conventional means to generate monochromatic light in the ultraviolet or infrared and to measure its absorption by a gas. An ultraviolet spectrometer, for example, is the 'gold standard' method for measuring ozone. Specific organic compounds can sometimes be individually measured by measuring absorption of infrared light at one or more wavelengths.

Photoacoustic Sensors—If a short pulse of infrared light is passed through an absorbing gas, the absorbed light energy becomes heat. The sudden expansion of the gas generates a pressure, or acoustic, wave, which can be measured with a microphone. These are a variation of infrared spectroscopic sensors, with an important twist: the PA sensor measures the light absorbed by the sample. This is in contrast to conventional spectroscopy, which measures the light not absorbed. Since photometric error is eliminated, very sensitive detection is possible. These sensors only became practical in recent years, when digital signal processing (DSP) chips became available to distinguish signal from background noise.

Sorption Sensors

Many types of sensors depend on the physical or chemical sorption of the analyte into a coating on the sensing surface. Depending on the device, the sorption phenomenon may be detected by measurement of mass, refractive index, color change, electrical resistance, etc.

Fiber-Optic—A thin glass or plastic fiber is coated with a thin layer of a compound that will absorb the analyte. When light is passed through the fiber and reflects from its inside surface, some of the light energy extends beyond the surface of the fiber. This effect is known as the evanescent wave, and its influence is usually no more than a few nanometers. A simple surface coating may absorb organic gases, changing its refractive index. The amount of light reflected inside the fiber is changed; this is detected by a receiver at the other end of the fiber from the light source. Other surface coatings may react with the analyte gas and change color, which will affect the spectrum of the reflected light.

Microbalances—The simplest form of this sensor uses a quartz crystal that is electronically made to vibrate at its natural frequency. The crystal is coated with a material that absorbs the analyte gas. The mass of the coating increases and slows down the natural rate of vibration of the crystal. The resulting frequency shifts can be measured electronically with great sensitivity. The basic microbalance has been elaborated into more sophisticated devices such as SAW (surface acoustic wave) and resonator devices, which are more sensitive than the simple bulk crystal. This class of sensors is sometimes referred to as gravimetric.

Conductive Polymer—Certain polymers, such as polyanilines and polythiophenes, are electrically conductive. The conductivity changes when the polymers absorb certain gases. The polymers can also be "tuned" to certain compounds by carrying out the polymerization in the presence of the analyte.

Elastomer Chemiresistor Sensors—These measure the very slight physical expansion of a film of an elastomeric material that occurs when it absorbs a gas. The elastomer, silicone rubber, for example, contains electrically conductive particles such as carbon. The concentration of particles is adjusted so that there are relatively few conducting paths through the elastomer. Slight expansion of the elastomer causes some of these paths to be broken, and the electrical resistance rapidly increases.

Reactive-Gate Semiconductor Devices—Most active semiconductor devices, such as MOSFET transistors, use voltages directly applied to the gate to control the flow of charge carriers. Chemically sensitive devices, however, use a chemical interaction to change the transconductance.

System

FIG. 1 is a box diagram of a drying time determining system 10 in accordance with one of the embodiments of the present invention. System 10 can include one or more condition sensors 20, a signal processor 30, a gas sensor (or solvent vapor detector) 40, a fuzzy logic control system 50, and a program selector 60. Items in dotted lines are optional.

In one aspect of the present invention, the drying time determining system 10 comprises a gas sensor 40 and a signal processor 30. In operation, the gas sensor 40 measures a concentration of lipophilic fluid vapor within a drying apparatus. Once the gas sensor 40 measures a "safe" lipophilic fluid vapor concentration, the gas sensor 40 sends a signal to the signal processor 30 which causes the drying apparatus to cease operating and subsequently permits a user of the drying apparatus to open the drying apparatus and gain access to the internal chamber of the drying apparatus.

The condition sensor 20 can be a sensor capable of measuring one or more of the following conditions: humidity, time, fabric load mass, temperature, lipophilic fluid flow from the drying apparatus, drying apparatus drum torque, inlet drying air temperature, outlet drying air temperature, and combinations thereof. The condition sensor 20 could be a humidity sensor, a mass load sensor, a temperature sensor, a timer, a fluid flow sensor, a torque sensor, etcetera. The condition sensor 20 is electrically coupled and can transmit a signal to a signal processor 30. Signal processor 30 is adapted to trigger the gas sensor 40 once a predetermined set point for the condition sensor 20 is reached. The gas sensor 40 then starts tracking the solvent vapor concentration and transmits its readings back to the signal processor 30. The signal processor 30 can also be coupled to fuzzy logic control system 50. Fuzzy logic control system 50 utilizes the signal coming from the signal processor 30 and the signal coming from the program selector 60 to estimate the remaining drying time for a particular load of clothes. The program selector 60 can be activated by the user and may reflect parameters such as the type of garments (e.g. silk, cotton, wool, etcetera) to be cleaned. These signals can then be incorporated into a programmed or programmable algorithm of the fuzzy logic control system 50 to determine remaining drying time.

Figure 2:
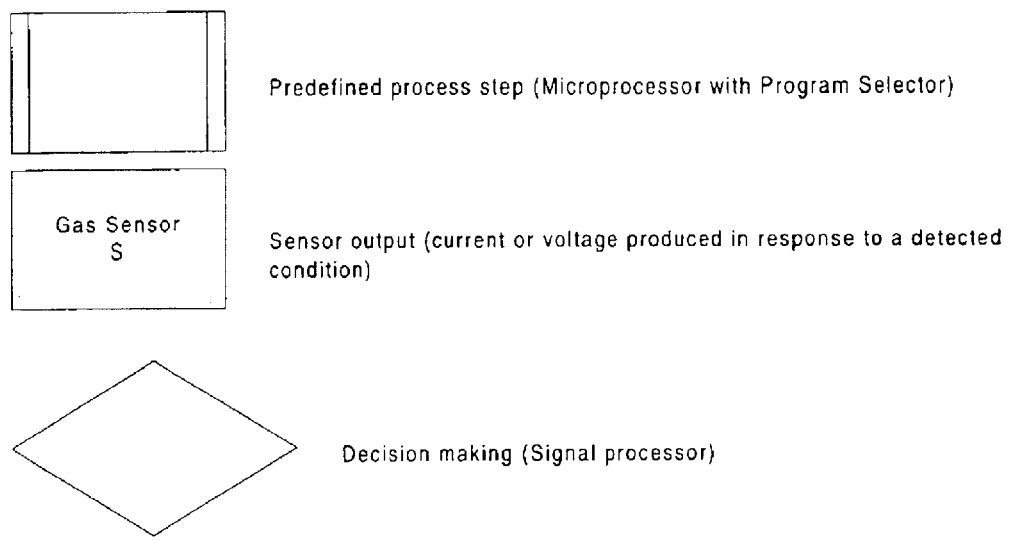
FIG. 2 shows annotations used in the procedure algorithms.

FIG. 2 shows annotations used in the procedure algorithms.

Figure 3:
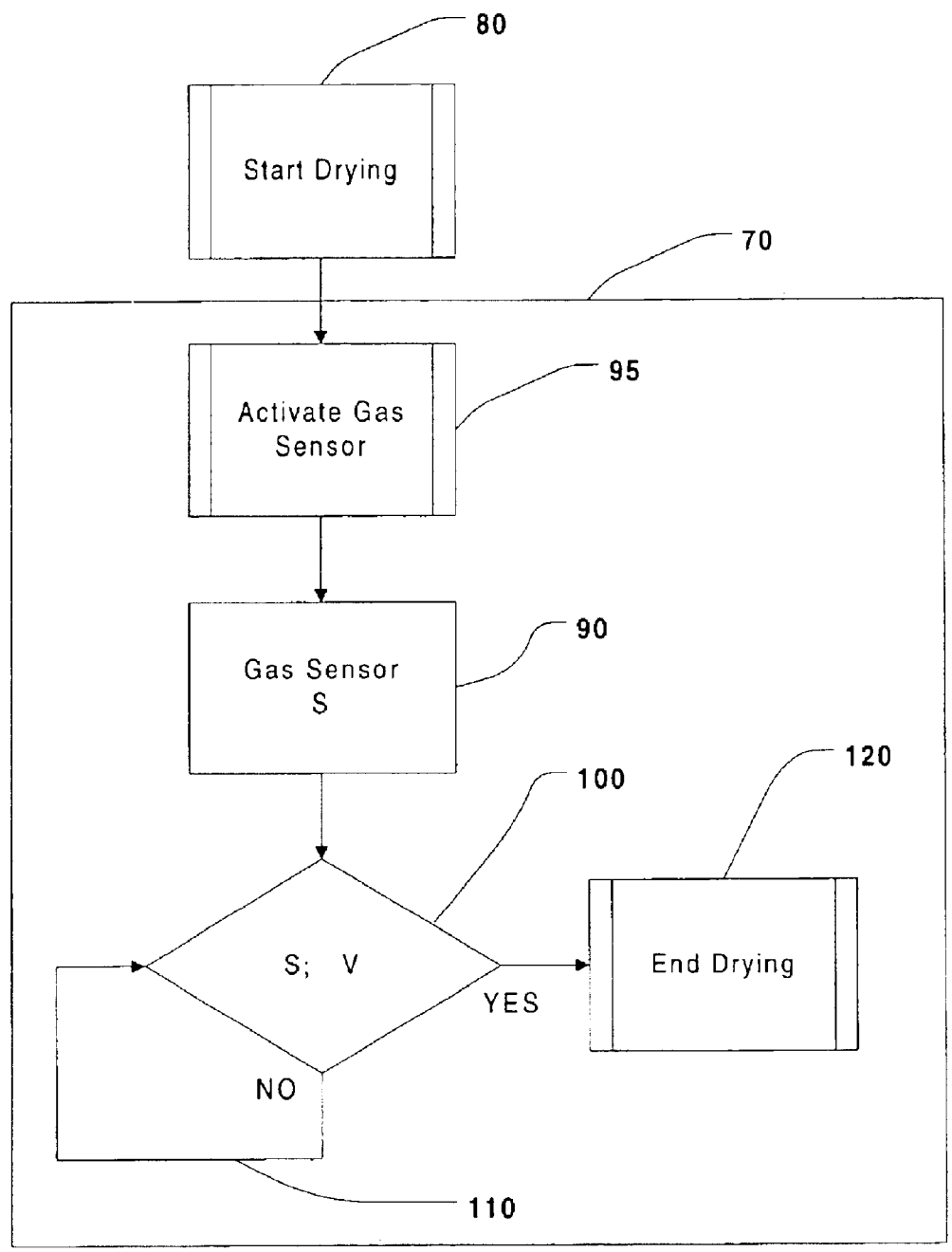
FIG. 3 is a signal handling procedure 70 including a gas sensor.

FIG. 3 schematically illustrates a gas sensor signal handling procedure 70 for use with the drying time determining system of the present invention. The procedure 70 is executed once a drying cycle of the drying apparatus begins (step 80), preferably by input from a user and through a microprocessor (fuzzy logic controller). When the drying cycle begins, a gas sensor 90 is activated (step 95), preferably by a microprocessor. The gas sensor 90 generates a signal S that represents vapor concentration present in the drying apparatus (step 90). A signal processor 100 monitors the gas sensor signal S. The signal processor 100 compares the value of S to a preset constant threshold value V that represents a vapor concentration equal or below the safe exposure limit (step 100). As long as the vapor concentration in the drying apparatus is greater than the safe exposure limit, the drying cycle continues (step 110). When the relation of S and V indicates that the vapor concentration in the drying apparatus is equal or below the safe exposure limit, the signal processor 100 sends a trigger signal to the microprocessor to end drying cycle (step 120).

Figure 4:
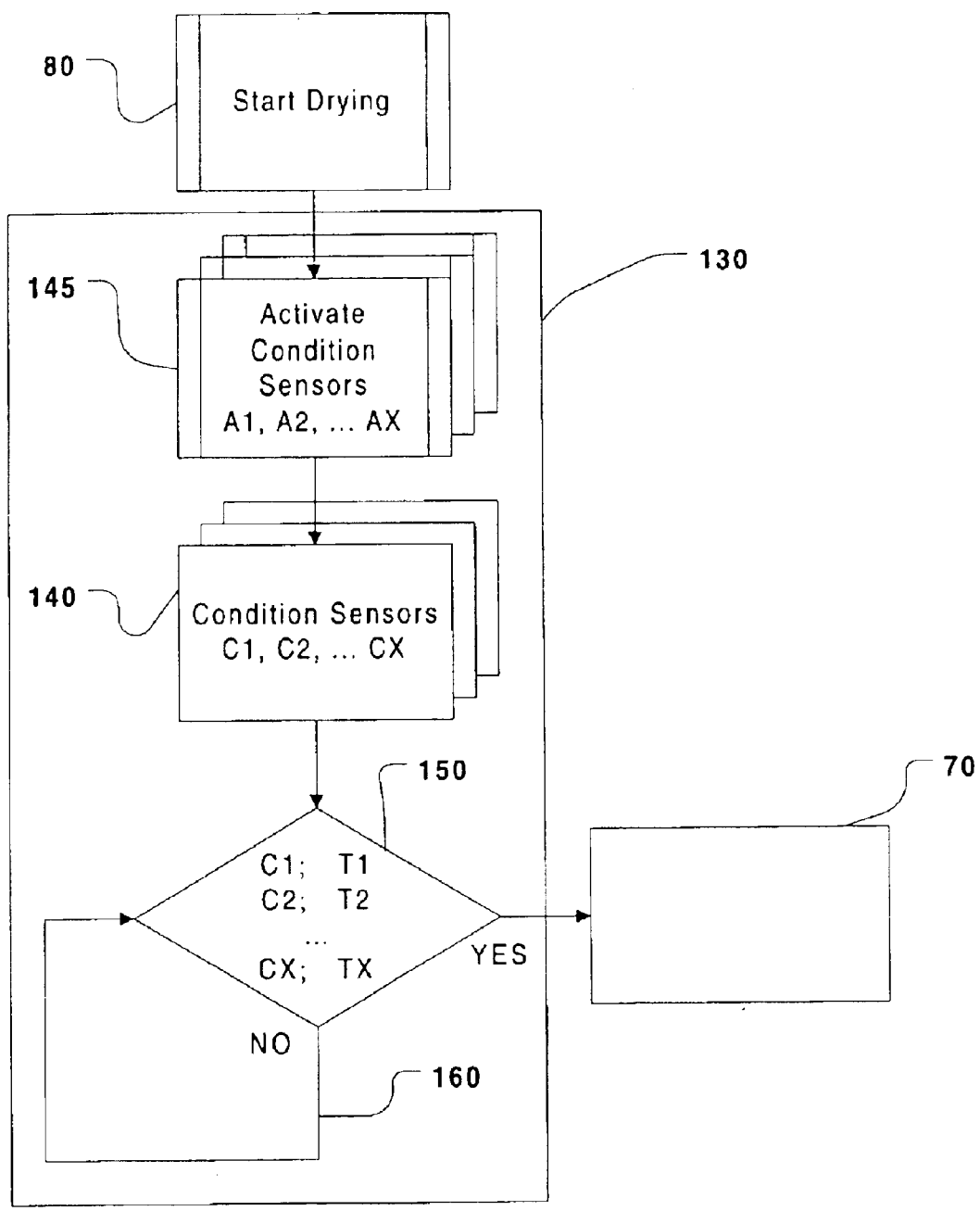
FIG. 4 is a signal handling procedure 130 that includes a gas sensor and condition sensors.

FIG. 4 schematically illustrates an alternative embodiment of a condition sensor signal handling procedure 130 for use with the drying time determining system of the present invention. The procedure 130 handles condition sensor signals produced by one or more condition sensors 140 and then executes previously described gas sensor signal handling procedure 70, as illustrated on FIG. 3. The purpose of the procedure 130 is to prevent the gas sensor fouling due to excessive concentration of vapor. The procedure 130 is executed once a drying cycle begins, preferably by input from a user and through a microprocessor (fuzzy logic controller) (step 80). When the drying cycle begins, one or more condition sensors 140 named A1, A2 . . . AX are activated (step 145), preferably by a microprocessor (step 120). The condition sensors 140 generate a set of signals C1, C2 . . . CX that represent a set of physical conditions such as time, temperature, pressure etc. A signal processor 150 monitors the condition sensors signals and compares the values of C1, C2 . . . CX to corresponding preset constant threshold values T1, T2 . . . TX that represent the set of predetermined physical conditions indicating the safe operation of the gas sensor 90 in FIG. 3. As long as the relation of the predetermined combinations of C1 and T1, C2 and T2, . . . CX and TX is not met, the drying cycle continues (step 16). When the above set of relations is achieved, the signal processor 150 sends a trigger signal activating the gas sensor signal handling procedure 70 of FIG. 3, preferably via a microprocessor.

Figure 5:
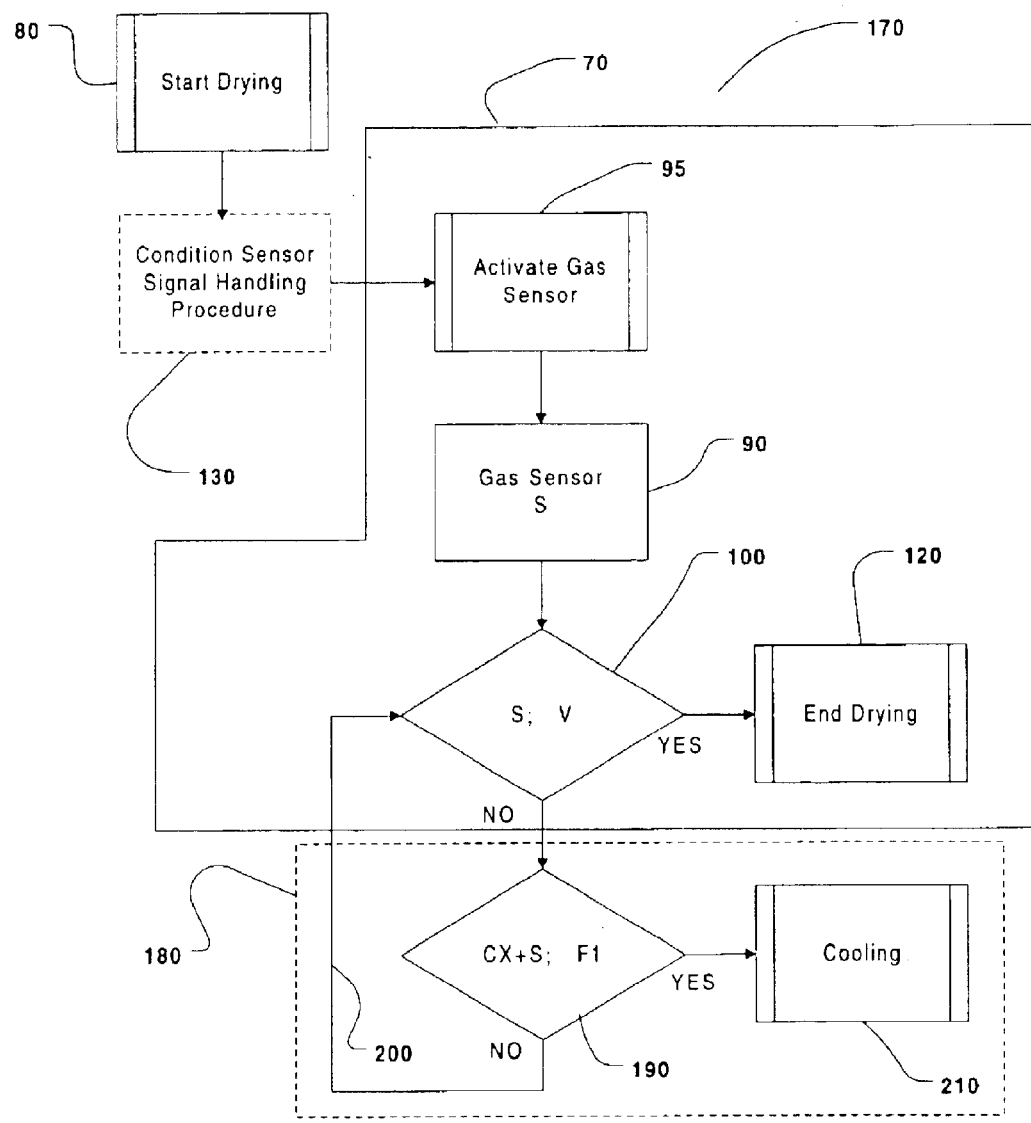
FIG. 5 is another signal handling procedure 170 that includes the gas sensor, and the condition sensors.

FIG. 5 schematically illustrates yet another embodiment of a combined gas sensor signal handling procedure 170 for use with the drying time determining system of the present invention. The procedure 170 is designed to: (1) determine the end of drying (procedure 70); (2) optionally, prevent gas sensor fouling (procedure 130); and (3) optionally, prevent reaching a flash point condition whenever a combustible/flammable lipophilic fluid is used (procedure 180). The procedure 70 is executed, as described in detail in FIG. 4, once a drying cycle of the drying apparatus begins (step 80), preferably by input from a user and preferably through a microprocessor (fuzzy logic controller). After the start of the drying cycle (step 80), the procedure 130 is executed to determine the physical conditions that will not cause gas sensor fouling. Once the appropriate physical conditions are met, the gas sensor signal handling procedure 70, as described in detail in FIG. 3, is activated. The procedure 70 is similar to the procedure 70 in FIG. 3 except that the step 110 is preferably replaced with the flash point procedure 180. The procedure 180 is executed as long as the step 100 indicates the vapor concentration is above the safe exposure limit. After the signal processor 100 acquires the gas sensor signal S, compares it to the threshold value V, and determines that the vapor concentration in the drying apparatus is above the safe exposure limit, then the flash point procedure 180 is executed. In the flash point procedure 180, the signal processor 190 forms a set of sensor signals that includes the gas sensor output S, and one or more condition sensors signals C1, C2 . . . CX. The condition sensors signals are selected to provide physical conditions that are suited to determine the flash point of the vapor.

In the preferred embodiment, the condition sensor is a temperature sensor. Since the flash point of the vapor is characterized by the amount of vapor and the temperature of the vapor, the combination of the gas sensor and the temperature sensor signals can indicate when the vapor on the drying apparatus is close to reaching the flash point. The signal processor 190 compares the set of the gas senor and the condition sensors to the corresponding set of threshold values V, T1, T2 . . . TX. The threshold values form a "code value" representing the conditions that are of indication that the drying apparatus is approaching the flash point. If the "code value" is not met, the drying cycle continues (step 200). Once the "code value" is reached, the signal processor 190 sends a trigger signal to the microprocessor to start a cooling cycle (step 210), since reduction of temperature would move the vapor condition from the flash point. The microprocessor may have a program to perform cooling for some period of time.

One of the systems of the present invention will be capable of automatically ending a drying cycle in a drying apparatus. It will include a lipophilic fluid vapor, and a gas sensor. The gas sensor should be capable of sensing the concentration of lipophilic fluid vapor present in the drying apparatus and transmitting a signal representative of the lipophilic fluid vapor concentration.

The signal transmitted from the gas sensor will trigger the drying cycle to end. This could occur at a lipophilic fluid vapor concentration of less than about 40 ppm, more preferably at less than about 20 ppm, even more preferably at less than about 15 ppm, and most preferably at less than about 10 ppm. However, one of the objects of the present invention is to automatically end a drying cycle once a "safe" level, if established for the particular lipophilic fluid, is reached. The "safe" level for any lipophilic fluid will be the lowest established exposure level for any type of human exposure. For instance, the established vapor inhalation "safe" limit is 10 ppm for decamethylcyclopentasiloxane, a preferred lipophilic fluid. Further, if decamethylcyclopentasiloxane is the lipophilic fluid utilized, vapor concentrations should be at or below 10 ppm before humans should come in contact with the fabrics. Therefore, a gas or vapor sensor used in a drying apparatus should trigger the drying cycle to end when the decamethylcyclopentasiloxane vapor concentration is at or below 10 ppm.

There are many gas sensors that would be suitable for use with the present invention. The gas sensors can be, but are not limited to, reactive sensors, physical property sensors, sorption sensors, and combination sensors utilizing at least two of the above sensing mechanisms. More specifically, the gas sensors can be, but are not limited to, electrochemical sensors, solid state semiconductor sensors, combustible gas sensors, flame ionization detectors, chemiluminescence sensors, nondispersive infrared sensors, spectroscopic sensors, photoacoustic sensors, fiber-optic sensors, microbalance sensors, conductive polymer sensors, elastomer chemiresistor sensors, reactive-gate semiconductor sensors, and combination sensors utilizing at least two of the above sensor types.

A preferred lipophilic fluid that generates the lipophilic fluid vapor to be sensed by the gas sensor is a linear siloxane, a cyclic siloxane, or a mixture of the two. More specifically, the siloxane can be octamethylcyclotetrasiloxane, decamethylcyclopentasiloxane, dodecamethylcyclohexasiloxane, or a mixture of at least two. Preferably, decamethylcyclopentasiloxane is the primary lipophilic fluid; and more preferably, the lipophilic fluid is substantially free of octamethylcyclotetrasiloxane.

The second system of the present invention will also be capable of automatically ending a drying cycle in a drying apparatus. This system will include a lipophilic fluid vapor to be sensed, a condition detector, and a gas sensor. The condition detector will be capable of activating the gas sensor and the gas sensor will, in turn, generate a signal representative of the lipophilic fluid vapor concentration in the dryer.

Once a predetermined lipophilic vapor concentration is reached and a signal representative of that vapor concentration is transmitted, the drying cycle will automatically end. The signal transmitted from the gas sensor will trigger the drying cycle to end. This could occur at a lipophilic fluid vapor concentration of less than about 40 ppm, more preferably at less than about 20 ppm, even more preferably at less than about 15 ppm, and most preferably at less than about 10 ppm. However, one of the objects of the present invention is to automatically end a drying cycle once a "safe" level, if established for the particular lipophilic fluid, is reached. As discussed above, the "safe" level for any lipophilic fluid will be the lowest established exposure level for any type of human exposure.

Fouling can be a problem for gas sensors, particularly when siloxane or silicone-based lipophilic fluids are utilized. Siloxanes have a particular tendency to leave a sticky or greasy residue on surfaces. This can occur as a result of lipophilic vapor condensing on a surface, or as a result of lipophilic fluid or vapor coming in contact with a hot surface. Many gas sensors have surfaces that operate at high temperatures and are therefore prone to fouling, particularly in a lipophilic fluid or vapor environment.

As such, the second system adds a condition detector to minimize or eliminate the fouling of the gas sensors. It does this by minimizing the total time a gas sensor is exposed to the lipophilic fluid vapor. A physical condition other than lipophilic fluid vapor is measured until the lipophilic fluid vapor concentration is lower. Non-limiting examples of physical conditions that can be measured include time, fabric load mass, temperature, lipophilic fluid flow from said drying apparatus, drying apparatus drum torque, inlet drying air temperature, outlet drying air temperature, humidity, and combinations of physical conditions.

For example, when a drying cycle is begun, a sensor that detects condensed lipophilic fluid flow from the dryer is automatically turned-on. This physical condition sensor measures condensed lipophilic fluid flow until it is reduced to a predetermined flow rate. Once the lower condensed lipophilic fluid flow rate is detected, the gas sensor is automatically turned-on. Because the gas sensor is "saved" until lipophilic fluid vapor concentrations are lower, the amount of fouling that occurs on the sensor is minimized or eliminated.

As in the first system, many gas sensors would be suitable for use with the present invention. They include, but are not limited to, reactive sensors, physical property sensors, sorption sensors, and combination sensors utilizing at least two of the above sensing mechanisms. More specifically, the gas sensors can be, but are not limited to, electrochemical sensors, solid state semiconductor sensors, combustible gas sensors, flame ionization detectors, chemiluminescence sensors, nondispersive infrared sensors, spectroscopic sensors, photoacoustic sensors, fiber-optic sensors, microbalance sensors, conductive polymer sensors, elastomer chemiresistor sensors, reactive-gate semiconductor sensors, and combination sensors utilizing at least two of the above sensor types.

Also as in the first system, the preferred lipophilic fluid to be detected is a linear siloxane, a cyclic siloxane, or a mixture of the two. More specifically, the siloxane can be octamethylcyclotetrasiloxane, decamethylcyclopentasiloxane, dodecamethylcyclohexasiloxane, or a mixture of at least two. Preferably, decamethylcyclopentasiloxane is the primary lipophilic fluid; and more preferably, the lipophilic fluid is substantially free of octamethylcyclotetrasiloxane.

It will be understood that the systems of the present invention may be combined with other fabric treatments. For example, prior to the application of the lipophilic fluid, the fabric articles may be subjected to the particulate removal method described in co-pending application Serial No. 60/191,965, to Noyes et al., filed Mar. 24, 2000, the relevant parts of which are incorporated herein by reference. The systems of the present invention can then be used to help dry the clothes automatically.

The systems of the present invention may be used in a service, such as a dry cleaning service, diaper service, uniform cleaning service, or commercial business, such as a Laundromat, dry cleaner, linen service which is part of a hotel, restaurant, convention center, airport, cruise ship, port facility, casino, or may be used in the home.

The systems of the present invention may be performed in an apparatus that is a modified existing apparatus and is retrofitted in such a manner as to conduct the process of the present invention in addition to related processes.

The systems of the present invention may also be performed in an apparatus, which is not a modified existing apparatus but is one specifically built in such a manner so as to conduct the present invention or may be added to another apparatus as part of a lipophilic fluid processing system. This would include all the associated plumbing, such as connection to a chemical and water supply, and sewerage for waste wash fluids.

The systems of the present invention may be used in an apparatus, which is not a modified existing apparatus but is one specifically built in such a manner so as to conduct the present invention and related processes.

The systems of the present invention may also be performed in an apparatus capable of "dual mode" functions. A "dual mode" apparatus is one capable of both washing and drying fabrics within the same drum. These apparati are commercially available, particularly in Europe.

An apparatus used to carry out the present invention will typically contain some type of control system. These include electrical systems, such as, the so-called smart control systems, as well as more traditional electro-mechanical systems. The control systems would enable the user to select the size of the fabric load to be cleaned, the type of soiling, the extent of the soiling, the time for the cleaning cycle. Alternatively, the user could use pre-set cleaning and/or refreshing cycles, or the apparatus could control the length of the cycle, based on any number of ascertainable parameters. This would be especially true for electrical control systems. For example, when the collection rate of lipophilic fluid reaches a steady rate the apparatus could turn its self off after a fixed period of time, or initiate another process for the lipophilic fluid.

In the case of electrical control systems, one option is to make the control device a so-called "smart device". This could mean including, but not limited to, self diagnostic system, load type and cycle selection, linking the machine to the Internet and allowing for the consumer to start the apparatus remotely, be informed when the apparatus has cleaned a fabric article, or for the supplier to remotely diagnose problems if the apparatus should break down. Furthermore, if the system of the present invention is only a part of a cleaning system, the so called "smart system" could be communicating with the other cleaning devices which would be used to complete the remainder of the cleaning process, such as a washing machine, and a dryer.

What is claimed is:

1. A system for controlling a drying cycle in a drying apparatus comprising:
   a first means for sensing the concentration of a lipophilic fluid vapor present in the drying apparatus;
   at least one second means for sensing a condition in the drying apparatus; and
   a signal processor operatively connected to said first and second means;
   wherein said signal process is configured to compare a first signal from said first means against a first threshold value and a second signal from said second means against a second threshold value.

2. A system according to claim 1 wherein said first means is configured to cooperate with said signal processor to terminate said drying cycle.

3. A system according to claim 1 wherein said first means is configured to cooperate with said signal processor to terminate said drying cycle when the lipophilic fluid vapor concertration is safe for human exposure.

4. A system according to claim 1 wherein said first means is configured to cooperate with said signal processor to terminate said drying cycle when the lipophilic fluid vapor concentration in said apparatus is less than about 40 ppm.

5. A system according to claim 1 wherein said first means is configured to cooperate with said signal processor to terminate said drying cycle when the lipophilic fluid vapor concentration in said apparatus is less than about 10 ppm.

6. A system according to claim 1 wherein said second means is a sensor selected from the group consisting of a humidity sensor, a timer, a mass sensor, a temperature sensor, a fluid flow sensor, a torque sensor, and combinations thereof.

7. A system according to claim 1 wherein said first means is of the type selected from the group consisting of reactive sensors, physical property sensors, sorption sensors, and combinations thereof.

8. A system according to claim 1 wherein said first means is of the type selected from the group consisting of electrochemical sensors, solid state semiconductor sensors, combustible gas sensors, flame ionization detectors, chemiluminescence sensors, nondispersive infrared sensors, spectroscopic sensors, photoacoustic sensors, fiber-optic sensors, microbalance sensors, conductive polymer sensors, elastomer chemiresistor sensors, reactive-gate semiconductor sensors, and combinations thereof.

9. A system according to claim 1 wherein said first means is capable of sensing a lipophilic fluid vapor selected from the group consisting of a linear siloxane vapor, a cyclic siloxane vapor, or mixtures thereof.

10. A system according to claim 1 wherein said first means is capable of sensing a lipophilic fluid vapor selected from the group consisting of octamethylcyclotetrasiloxane vapor, decamethylcyclopentasiloxane vapor, dodecamethylcyclohexasiloxane vapor, and mixtures thereof.

11. A system according to claim 1 wherein said first means is capable of sensing a lipophilic fluid vapor comprising dodecamethylcyclohexasiloxane vapor.

12. A system according to claim 1 wherein said first means is capable of sensing a lipophilic fluid vapor comprising dodecamethylcyclohexasiloxane vapor and is substantially free of octamethylcyclotetrasiloxane vapor.

13. A system for controlling a drying cycle in a dual mode apparatus capable of washing and drying fabrics within the same drum, the system comprising:
   a gas sensor for detecting a lipophilic fluid vapor;
   at least one condition sensor for sensing a condition in the drying apparatus; and
   a signal processor operatively connected to said gas sensor and said condition sensor;
   wherein said signal processor is configured to compare a first signal from said gas sensor against a first threshold value and a second signal from said condition sensor against a second threshold value.

14. A system according to claim 13 wherein said gas sensor is configured to cooperate with said signal processor to terminate said drying cycle when the lipophilic fluid vapor concentration in said apparatus is less than about 40 ppm.

15. A system according to claim 13 wherein said gas sensor is selected from the group consisting of reactive sensors, physical property sensors, sorption sensors, and combinations thereof.

16. A system according to claim 13 wherein said gas sensor is capable of sensing a lipophilic fluid vapor selected from the group consisting of a linear siloxane vapor, a cyclic siloxane vapor, or mixtures thereof.

17. A system according to claim 13 wherein said condition sensor is selected from the group consisting of a humidity sensor, a timer, a mass sensor, a temperature sensor, a fluid flow sensor, a torque sensor, and combinations thereof.

18. A system according to claim 13 wherein said gas sensor is of the type selected from the group consisting of electrochemical sensors, solid state semiconductor sensors, combustible gas sensors, flame ionization detectors, chemiluminescence sensors, nondispersive infrared sensors, spectroscopic sensors, photoacoustic sensors, fiber-optic sensors, microbalance sensors, conductive polymer sensors, elastomer Chemiresistor sensors, reactive-gate semiconductor sensors, and combinations thereof.

19. A system according to claim 13 wherein said gas sensor is capable of sensing a lipophilic fluid vapor selected from the group consisting of octamethylcyclotetrasiloxane vapor, decamethylcyclopentasiloxane vapor, dodecamethylcyclohexasiloxane vapor, and mixture.

* * * * *

UNITED STATES PATENT AND TRADEMARK OFFICE
CERTIFICATE OF CORRECTION

PATENT NO. : 6,840,069 B2
DATED : January 11, 2005
INVENTOR(S) : Paul Amaat Raymond Gerard France It is certified that error appears in the above-identified patent and that said Letters Patent is hereby corrected as shown below:

Column 15,
Line 47, please replace "concertration" with -- concentration --.

Column 16,
Lines 18 and 21, please replace "dodecamethylcyclohexasiloxane" with
-- decamethylcyclopentasiloxane --.

Signed and Sealed this

Eleventh Day of October, 2005

JON W. DUDAS
*Director of the United States Patent and Trademark Office*